United States Patent
Fan

(10) Patent No.: US 8,764,967 B2
(45) Date of Patent: Jul. 1, 2014

(54) ON-SITE FRYING OIL REGENERATION METHOD AND APPARATUS

(75) Inventor: Qinbai Fan, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 908 days.

(21) Appl. No.: 12/533,048

(22) Filed: Jul. 31, 2009

(65) Prior Publication Data

US 2011/0027431 A1    Feb. 3, 2011

(51) Int. Cl.
*C10G 15/08* (2006.01)
*A23L 3/32* (2006.01)
*C07C 51/36* (2006.01)

(52) U.S. Cl.
USPC ........... 205/696; 204/240; 204/252; 205/770; 426/244; 554/147

(58) Field of Classification Search
USPC .................. 204/240, 252; 205/695, 696, 770; 426/244; 554/141, 147
See application file for complete search history.

(56) References Cited

U.S. PATENT DOCUMENTS

| | | | | | |
|---|---|---|---|---|---|
| 1,390,689 | A | * | 9/1921 | Ellis, Carleton | 426/607 |
| 3,231,390 | A | * | 1/1966 | Hoover | 426/417 |
| 3,954,819 | A | * | 5/1976 | Husch | 426/417 |
| 4,059,498 | A | * | 11/1977 | Crissman et al. | 204/562 |
| 4,399,007 | A | * | 8/1983 | Fröling et al. | 205/441 |
| 4,917,782 | A | * | 4/1990 | Davies | 204/240 |
| 5,718,934 | A | * | 2/1998 | Hayakawa | 426/237 |
| 6,180,146 | B1 | * | 1/2001 | Del Gallo et al. | 205/687 |
| 6,218,556 | B1 | * | 4/2001 | Pintauro | 205/696 |
| 2002/0006460 | A1 | * | 1/2002 | Hwang | 426/438 |

OTHER PUBLICATIONS

M.K. Gupta. "Frying Oils." Bailey's Industrial Oil and Fat Products. Apr. 2005. Sixth Edition, vol. 4. pp. 1-31.*

* cited by examiner

*Primary Examiner* — Keith Hendricks
*Assistant Examiner* — Steven A. Friday
(74) *Attorney, Agent, or Firm* — Pauley Petersen & Erickson

(57) ABSTRACT

A method and system for regenerating used cooking oil in which the used cooking oil is introduced into a cooking oil regenerator, which includes an electrochemical device having a high temperature proton exchange membrane disposed between an anode electrode and a cathode electrode. A voltage is applied between the anode electrode and the cathode electrode using an external electricity source, producing regenerated cooking oil.

18 Claims, 3 Drawing Sheets

Anode: $2H_2O \longrightarrow O_2 + 4H^+ + 4e^-$

Cathode: $ROOH + 2H^+ + 2e^- \longrightarrow ROH + H_2O$

ON-SITE FRYING OIL REGENERATION METHOD AND APPARATUS

BACKGROUND OF THE INVENTION

This invention relates to a method and apparatus for regenerating frying and cooking oils. More particularly, this invention relates to the use of electrochemical reduction for on-site regeneration of frying and cooking oils.

Frying is a process in which food is placed in a bed of cooking oil at a temperature in the range of about 300° F. to about 500° F. During the process, the food is subjected to simultaneous heat and mass transfer, accompanied by numerous chemical reactions. Frying processes may be carried out in homes, restaurants, food services and in industrial fryers. Large scale production is carried out in industrial fryers for wholesale and retail distribution of fried food. Restaurant or food service providers typically use relatively small batch fryers in which the oil content may range from about 50 pounds to about 120 pounds. Industrial fryers, also sometimes referred to as kettle fryers, are larger in size and may be batch or continuous in operation. The oil in both batch and continuous fryers may be heated either directly or indirectly and is typically continuously circulated through a filter.

During the frying process, the cooking oil undergoes several reactions. The most common reactions are hydrolysis, which is the reaction of water released from the fried food with the cooking oil, resulting in the formation of free fatty acids, autoxidation, which generates peroxides, and polymerization, which forms long carbon chain organic polymers. The rate of hydrolysis and corresponding formation of free fatty acids depends on several factors and determines when the cooking oil, also sometimes referred to herein as frying oil, needs to be replaced. These factors include the amount of water in the fried food or added during processing of the food, the temperature at which the food is fried, and the rate of oil replacement. Generally, in order to reduce or eliminate the formation of free fatty acid due to hydrolysis, two methods are employed—the use of an inhibitor, such as polysaccharides and dietary fibers for the chemical reaction of oil hydrolysis or the use of a scavenger, such as butylated hydroxy anisole (BHA), propyl gallate, and aminoguanidine, that collects the free fatty acids as they are formed. However, neither of these methods can regenerate the cooking oil or extend the lifetime of the cooking oil during frying.

In new cooking oil as received, some free radicals, primarily from unsaturated oil, are present. The free radicals in the presence of oxygen and water initiate chain reactions to produce hydroperoxide which can affect the flavor of the food. In addition, the free radicals initiate undesirable polymerization reactions at high temperatures.

SUMMARY OF THE INVENTION

It is one object of this invention to provide a method and apparatus for extending the lifetime of cooking oil used in frying processes.

It is one object of this invention to provide a method and apparatus for regenerating cooking oil on-site by continuously removing water, reducing hydroperoxide, and converting free radicals to stable oil.

These and other objects of this invention are addressed by a method and system for regeneration of cooking oil, the system comprising a food fryer having a regenerated cooking oil inlet and a used cooking oil outlet, a cooking oil regenerator comprising at least one electrochemical cell comprising a high temperature proton exchange membrane between an anode electrode and a cathode electrode and having a used cooking oil inlet and a regenerated cooking oil outlet, and a filter element interposed between the food fryer and the cooking oil regenerator having a first side in fluid communication with the used cooking oil outlet of the food fryer and a second side in fluid communication with the used cooking oil inlet of the cooking oil regenerator. In accordance with the method of this invention, the used cooking oil from the food fryer is introduced into the cooking oil regenerator and a voltage is applied between the anode electrode and the cathode electrode using an external electricity source, thereby producing regenerated cooking oil, which may then be recirculated back to the food fryer.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

As used herein, the term "high temperature" refers to temperatures in the range of about 300° F. to about 500° F. Thus, high temperature proton exchange membranes in accordance with the method and system of this invention are membranes which are proton and water permeable and which are capable of withstanding temperatures in said range. As used herein, the term "proton exchange membrane" refers to a membrane which is proton permeable.

Figure 1:
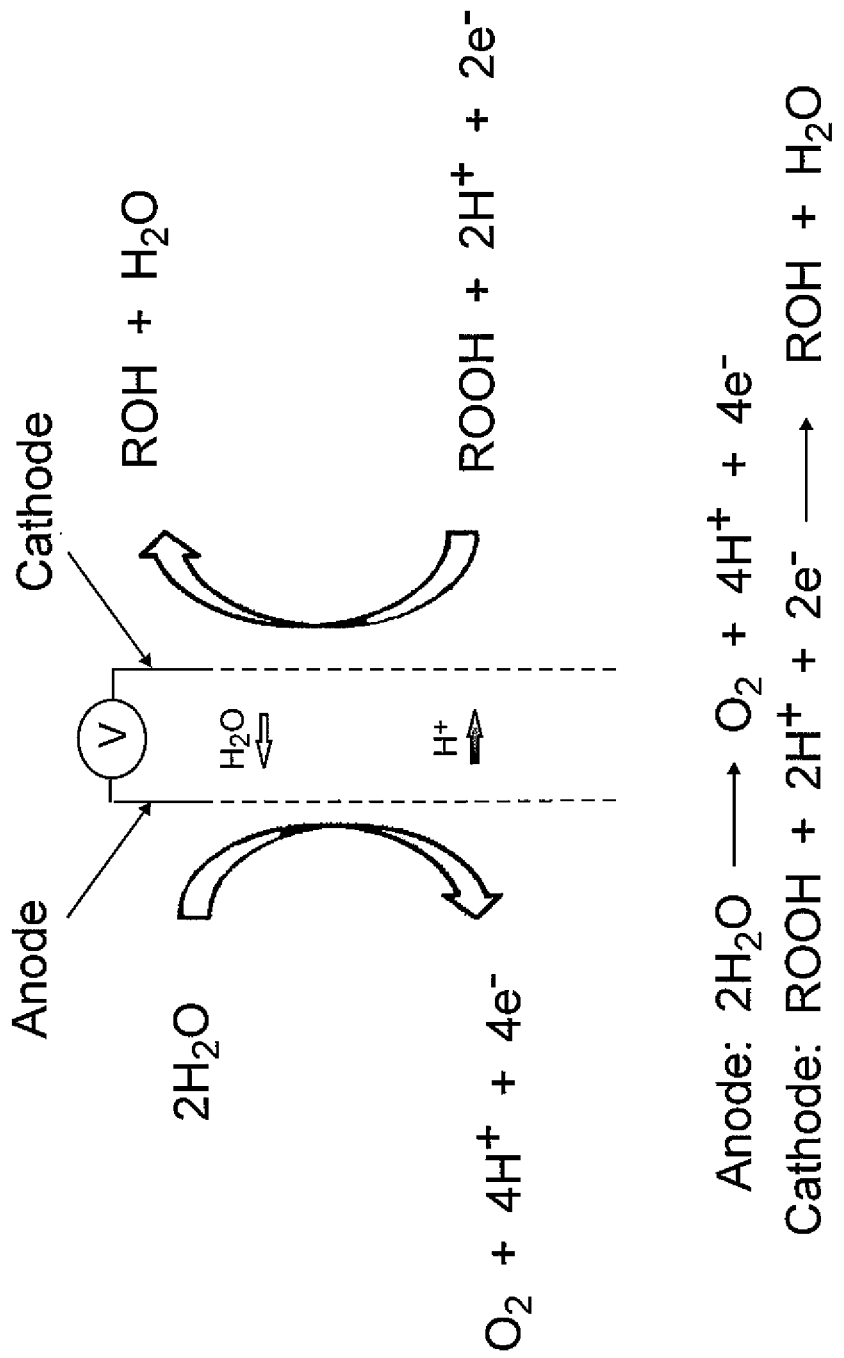
FIG. 1 is a diagram showing the electrochemical cell reactions for regenerating used cooking oil in accordance with the method of this invention.

The invention disclosed herein is a system and method for regenerating used cooking oil on-site using a high temperature electrochemical regenerator. The electrochemical regenerator removes water, which is introduced into the cooking oil by way of the frying food, removes peroxide, which is formed by the high temperature frying process, and reduces polymerization by way of electrochemical reduction using a proton/water permeable membrane at frying temperatures in the range of about 300° F. to about 500° F. As shown in FIG. 1, the reactions are:

Anode electrode: $2H_2O \rightarrow O_2 + 4H^+ + 4e^-$

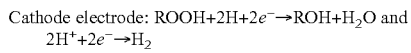

Cathode electrode: $ROOH + 2H + 2e^- \rightarrow ROH + H_2O$ and $2H^+ + 2e^- \rightarrow H_2$ where R is a longer alkyl chain. By longer alkyl chain, we mean carbon chain lengths of 14 or more carbons. The electrochemical process steps employed by this invention include 1) electrochemical reduction of the peroxide ROOH in the cooking oil to ROH, which reacts with fatty acid to recover triglyceride; 2) extraction and electrolysis of water to produce hydrogen, which removes trace metal ions, such as Cr, Cd, Cu, Hg, and the like, which may be in the cooking oil due to fryer corrosion and utensil erosion at high temperatures and which reduces the hydrolysis reaction; and 3) elimination of the formation of R radicals, which are the source of polymerization, by maintaining a reducing environment in the cooking oil. The reduction reactions of the radicals are:

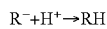

Figure 2:
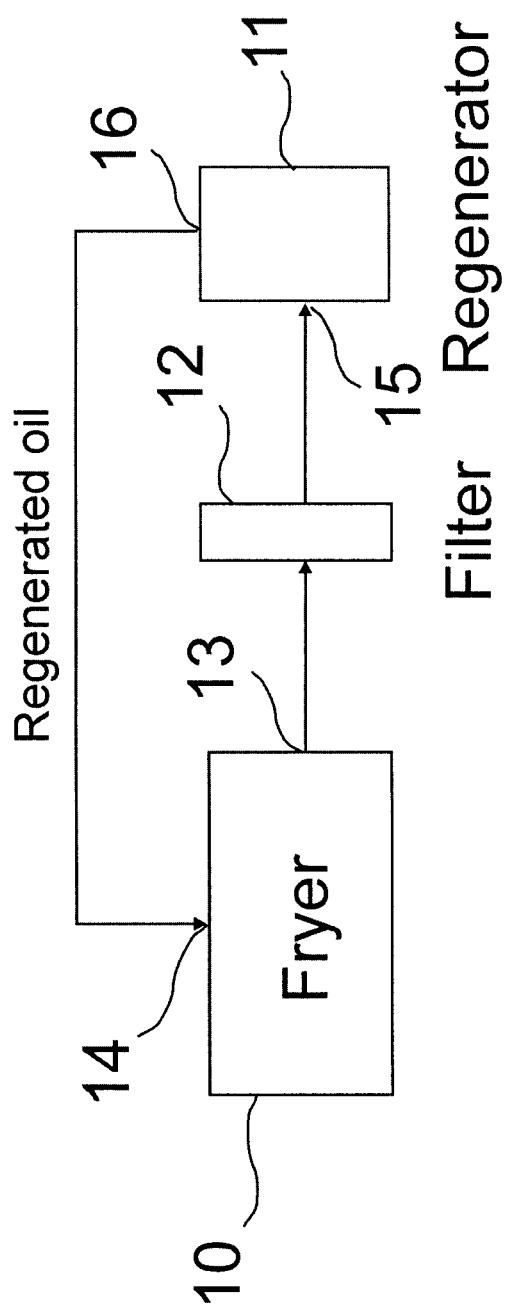
FIG. 2 is a process flow diagram showing the basic components of the system of this invention.

The method of this invention is carried out by a system, the basic components of which are shown in FIG. 2, comprising a food fryer 10, a cooking oil regenerator 11, which comprises at least one high temperature proton exchange membrane electrolyzer unit (FIG. 3), and a filter element 12. To enable on-site processing of the cooking oil, the food fryer 10 has a used cooking oil outlet 13 and a regenerated cooking oil inlet 14; the cooking oil regenerator 11 has a used cooking oil inlet 15 in fluid communication with the used cooking oil outlet 13 of the food fryer 10; and the cooking oil regenerator 11 has a regenerated cooking oil outlet 16 in fluid communication with the regenerated cooking oil inlet of the food fryer. In this way, the cooking oil may be continuously circulated from the food fryer, through the particle filter, into the cooking oil regenerator, and back to the food fryer.

Figure 3:
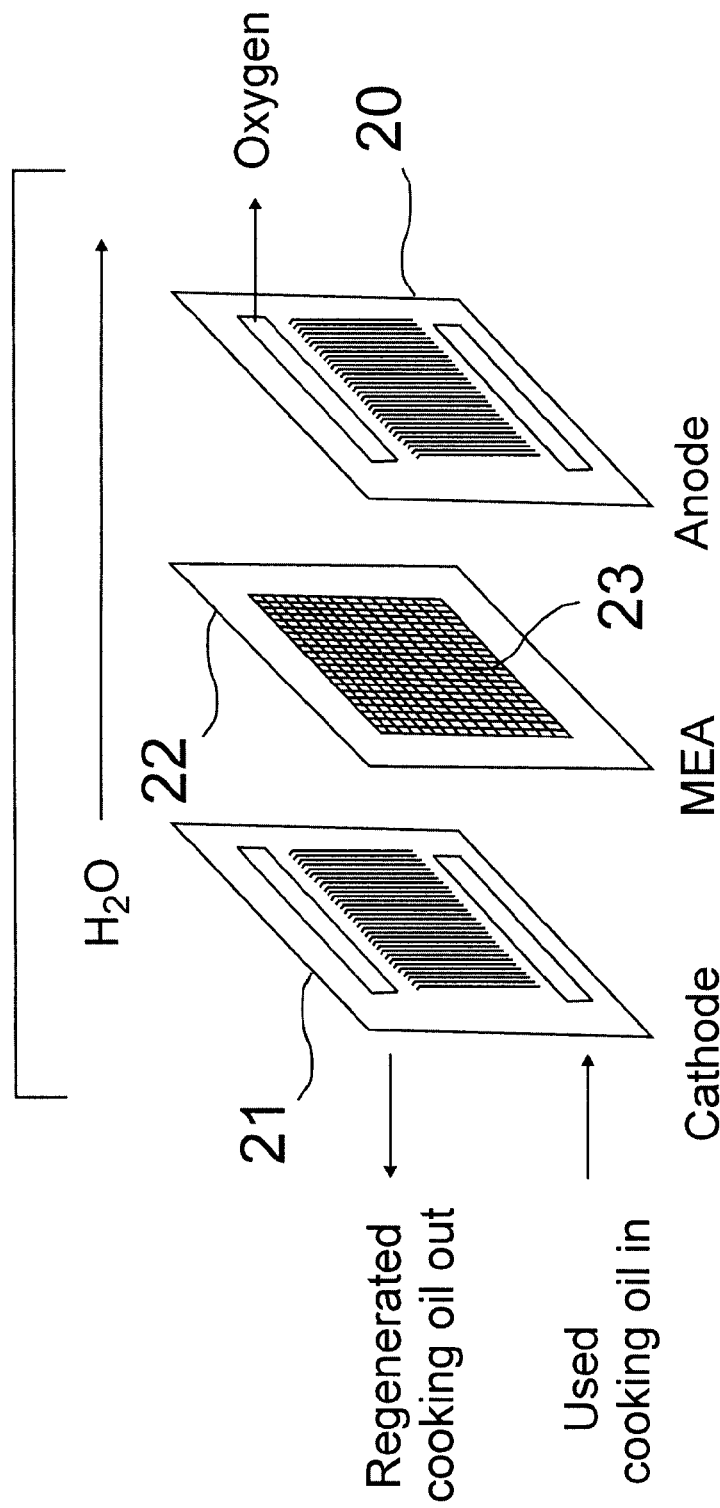
FIG. 3 is an exploded view of an electrochemical cell employed in the cooking oil regenerator employed in the method of this invention.

A high temperature proton exchange membrane electrolyzer unit used in the cooking oil regenerator in accordance with one embodiment of this invention is shown in FIG. 3 and comprises anode electrode 20 and cathode electrode 21, both of which are made of stainless steel. As shown in FIG. 1, external electricity is provided between the anode and cathode electrodes to enable the water electrolysis and peroxide reduction as well as dehydration. Disposed between the anode electrode and the cathode electrode is a membrane electrode assembly 22 comprising a proton exchange membrane suitable for use at temperatures up to about 500° F. disposed between two mesh current collectors 23 having pore sizes preferably greater than or equal to about 1 μm, only one current collector of which is shown in FIG. 3, for support of the proton exchange membrane. Suitable materials for use as current collectors in accordance with one embodiment of this invention are stainless steel (preferred), nickel, and copper. Materials suitable for use in the proton exchange membrane employed in the method and system of this invention include high temperature polymer-bound inorganic phosphates, such as $LaP_3O_9$, inorganic polyacids, such as polytungstic acid, ceramic proton exchange membranes, such as zirconate perovskites, inorganic-organic polymer composite membranes, polybenzimidazole and NAFION® (sulfonated tetrafluoroethylene). The use of composite graphite plates in the electrolyzer unit is not feasible because of the requirement of eliminating any possible contaminants to the cooking oil.

Particle filter materials suitable for use in the filter element 12 are porous materials which are substantially non-reactive with the cooking oil having pore sizes in the range of about 0.1 mm to about 1.0 mm. In accordance with one embodiment of this invention, the particle filter elements comprise paper filters supported by coarse perforated metal, glass frit, silica-based filters, and porous metal filters, such as porous stainless steel or porous nickel.

The size of the electrolyzer cell employed in the cooking oil regenerator depends on the amount of frying oil being processed. In operation, the cell voltage is maintained at a constant voltage of at least 1.6 V to guarantee the decomposition of water. This constant voltage mode enables the cooking oil at the cathode side of the electrolyzer to be in a reducing environment to eliminate any peroxides. The use of cell voltages less than 1.6 V will result in the removal of only some metal ions. Cell voltages as high as 120 V D.C. may be employed in a constant current.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

What is claimed is:

1. A method for regenerating used cooking oil comprising the steps of:
   introducing cooking oil used in frying at a temperature in a range of about 300° F. to about 500° F. into a cooking oil regenerator, said used cooking oil at a temperature in a range of about 300° F. to about 500° F., said cooking oil regenerator comprising an electrochemical device comprising a high temperature proton exchange membrane disposed between an anode electrode and a stainless steel cathode electrode; and
   applying a voltage between said anode electrode and said cathode electrode using an external electricity source, to continuously electrochemically:
   a) remove water
   b) reduce peroxides, and
   c) convert free radicals to stable oil, thereby producing regenerated cooking oil; and
   frying food with said regenerated cooking oil.

2. The method of claim 1, wherein particles in said used cooking oil are removed from said used cooking oil prior to introduction of said used cooking oil into said cooking oil regenerator.

3. The method of claim 2, wherein said particles are removed by passing said used cooking oil through a filter.

4. The method of claim 1, wherein said used cooking oil is introduced to a cathode electrode facing side of said high temperature proton exchange membrane.

5. The method of claim 4, wherein said voltage is constant.

6. The method of claim 5, wherein said voltage is at least 1.6 V.

7. The method of claim 5, wherein said cathode electrode facing side of said high temperature proton exchange membrane has a reducing environment, enabling removal of peroxides in said used cooking oil.

8. The method of claim 1, wherein water in said used cooking oil is extracted and electrolyzed in said cooking oil regenerator, producing hydrogen gas on a cathode facing side of said high temperature proton exchange membrane.

9. The method of claim 8, wherein at least a portion of said hydrogen gas reacts with metal ions in said cooking oil for removal of said metal ions.

10. A method for regenerating used high temperature fry cooking oil, said method comprising:
    removing high temperature cooking oil used in frying from a fryer;
    introducing said used high temperature cooking oil at a temperature in a range of about 300° F. to about 500° F. into a cooking oil regenerator comprising an electrochemical device comprising a high temperature proton exchange membrane disposed between an anode electrode and a stainless steel cathode electrode; and
    applying a voltage between said anode electrode and said cathode electrode using an external electricity source, to continuously electrochemically:
    a) remove water,
    b) reduce peroxides, and
    c) convert free radicals to stable oil, thereby producing regenerated cooking oil.

11. The method of claim 10 additionally comprising the step of:
    passing said used high temperature cooking oil through a filter to remove particles in said used high temperature prior to introduction of said used high temperature cooking oil into said cooking oil regenerator.

12. The method of claim 10, wherein said used high temperature cooking oil is introduced to a cathode electrode facing side of said high temperature proton exchange membrane.

13. The method of claim 12, wherein said voltage is constant.

14. The method of claim 13, wherein said voltage is at least 1.6 V.

15. A method for on-site continuous regeneration of high temperature fry cooking oil, said method comprising:
    removing high temperature cooking oil used in frying from a fryer;
    introducing the used high temperature cooking oil at a temperature in a range of about 300° F. to about 500° F. into a cooking oil regenerator comprising an electrochemical device comprising a high temperature proton exchange membrane disposed between an anode electrode and a stainless steel cathode electrode, wherein the used high temperature cooking oil is introduced to a cathode electrode facing side of the high temperature proton exchange membrane;
    applying a voltage between the anode electrode and the cathode electrode using an external electricity source to continuously electrochemically:
    a) remove water,
    b) reduce peroxides, and
    c) convert free radicals to stable oil, thereby producing regenerated cooking oil; and
    recirculating the regenerated cooking oil to the fryer.

16. The method of claim 15 additionally comprising the step of:
    passing the used high temperature cooking oil through a filter to remove particles in the used high temperature prior to introduction of the used high temperature cooking oil into the cooking oil regenerator.

17. The method of claim 15, wherein the voltage is constant.

18. The method of claim 15, wherein the voltage is at least 1.6 V.

* * * * *